(12) United States Patent
Furuta et al.

(10) Patent No.: US 12,151,646 B2
(45) Date of Patent: Nov. 26, 2024

(54) COMMUNICATION SYSTEM AND COMMUNICATION INSTRUMENTS

(71) Applicant: KABUSHIKI KAISHA TOKAI RIKA DENKI SEISAKUSHO, Aichi (JP)

(72) Inventors: Masateru Furuta, Aichi (JP); Yosuke Ohashi, Aichi (JP); Tetsuya Kobayashi, Toyota (JP); Yuya Goto, Toyota (JP); Satoshi Ozawa, Toyota (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 139 days.

(21) Appl. No.: 17/602,132

(22) PCT Filed: Feb. 28, 2020

(86) PCT No.: PCT/JP2020/008358
§ 371 (c)(1),
(2) Date: Oct. 7, 2021

(87) PCT Pub. No.: WO2020/208973
PCT Pub. Date: Oct. 15, 2020

(65) Prior Publication Data
US 2022/0144212 A1  May 12, 2022

(30) Foreign Application Priority Data
Apr. 12, 2019 (JP) .................................. 2019-076298

(51) Int. Cl.
*B60R 25/24* (2013.01)
*G07C 9/32* (2020.01)
(Continued)

(52) U.S. Cl.
CPC ................ *B60R 25/24* (2013.01); *G07C 9/32* (2020.01); *G01S 13/79* (2013.01); *H04B 1/59* (2013.01)

(58) Field of Classification Search
CPC ........... B60R 25/24; G07C 9/32; G01S 13/79; H04B 1/59
See application file for complete search history.

(56) References Cited

U.S. PATENT DOCUMENTS 10,235,823 B1 *  3/2019  Saleh ..................... H04B 17/27
2007/0109109 A1 *  5/2007  Li ............................ G01S 7/523
340/435

(Continued)

FOREIGN PATENT DOCUMENTS

| CN | 109383451 A | 2/2019 |
| JP | 2011-234079 A | 11/2011 |
| JP | 2012-036582 A | 2/2012 |

OTHER PUBLICATIONS

International Search Report (including English Language Translation), mailed Apr. 14, 2020 by the Japan Patent Office (JPO), in International Application No. PCT/JP2020/008358.

*Primary Examiner* — Thomas D Alunkal
(74) *Attorney, Agent, or Firm* — GREENBLUM & BERNSTEIN, P.L.C.

(57) ABSTRACT

A communication system that performs first communication and second communication, which differs from the first communication, through wireless connection between a terminal and a communication peer, is provided. The communication system includes communication devices arranged in the communication peer. At least one of the communication devices performs the second communication. The communication devices include a first communication device and a second communication device, which differs from the first communication device. The first com- (Continued)

munication device is connected to a controller that controls the communication devices, and the second communication device is connected to the first communication device.

8 Claims, 3 Drawing Sheets

(51) Int. Cl.
    *G01S 13/79*       (2006.01)
    *H04B 1/59*       (2006.01)

(56)           References Cited

U.S. PATENT DOCUMENTS

| | | | |
|---|---|---|---|
| 2008/0143477 A1* | 6/2008 | Eichin | G07C 9/00309 340/5.61 |
| 2009/0206989 A1* | 8/2009 | Leitch | B60R 25/24 340/5.61 |
| 2011/0261797 A1 | 10/2011 | Yamaguchi | |
| 2017/0105101 A1* | 4/2017 | Santavicca | H04B 17/318 |
| 2018/0099643 A1* | 4/2018 | Golsch | G01S 13/765 |
| 2018/0268628 A1* | 9/2018 | Jain | G07C 9/00182 |
| 2019/0037034 A1* | 1/2019 | Lee | H04L 67/52 |
| 2019/0053021 A1 | 2/2019 | Fuke | |
| 2019/0241154 A1* | 8/2019 | Elangovan | B60R 25/245 |
| 2020/0037157 A1* | 1/2020 | Agarwal | H04W 12/106 |
| 2020/0120509 A1* | 4/2020 | Stitt | H04W 12/64 |

\* cited by examiner

COMMUNICATION SYSTEM AND COMMUNICATION INSTRUMENTS

TECHNICAL FIELD

The invention relates to a communication system and a communication device.

BACKGROUND ART

A known communication system, which is installed in, for example, a vehicle, verifies the authenticity of a terminal, which is carried by a user, through wireless communication established between the terminal and the vehicle to control the vehicle in accordance with the authentication result. The communication system described in Patent Document 1 performs ID verification through wireless communication when a mobile terminal automatically responds to radio waves transmitted from a vehicle.

Patent Document 1: Japanese Laid-Open Patent Publication No. 2012-036582

SUMMARY

Authentication may require communication for distance measurement in addition to communication for ID verification. In distance measurement communication, the distance between a terminal and its communication peer is measured using radio waves transmitted between the terminal and the communication peer. Significant modifications are not desirable when, for example, adding a communication functionality for distance measurement to a conventional communication system.

It is an objective of the invention to provide a communication system and a communication device that allows communication that differs from the conventional communication to be performed without requiring major design changes.

A communication system according to one embodiment performs first communication and second communication, which differs from the first communication, through wireless connection between a terminal and a communication peer. The communication system includes communication devices arranged in the communication peer. At least one of the communication devices performs the second communication. The communication devices include a first communication device and a second communication device, which differs from the first communication device. The first communication device is connected to a controller that controls the communication devices. The second communication device is connected to the first communication device.

A communication device according to one embodiment is configured to be connected to a controller that controls the communication device. The communication device is further configured to be connected to another communication device. Communication performed between the communication device and the controller differs from communication performed between the communication device and the other communication device.

DESCRIPTION OF THE EMBODIMENTS

A communication system and a communication device according to one embodiment will now be described with reference to FIGS. 1 to 3.

Figure 1:
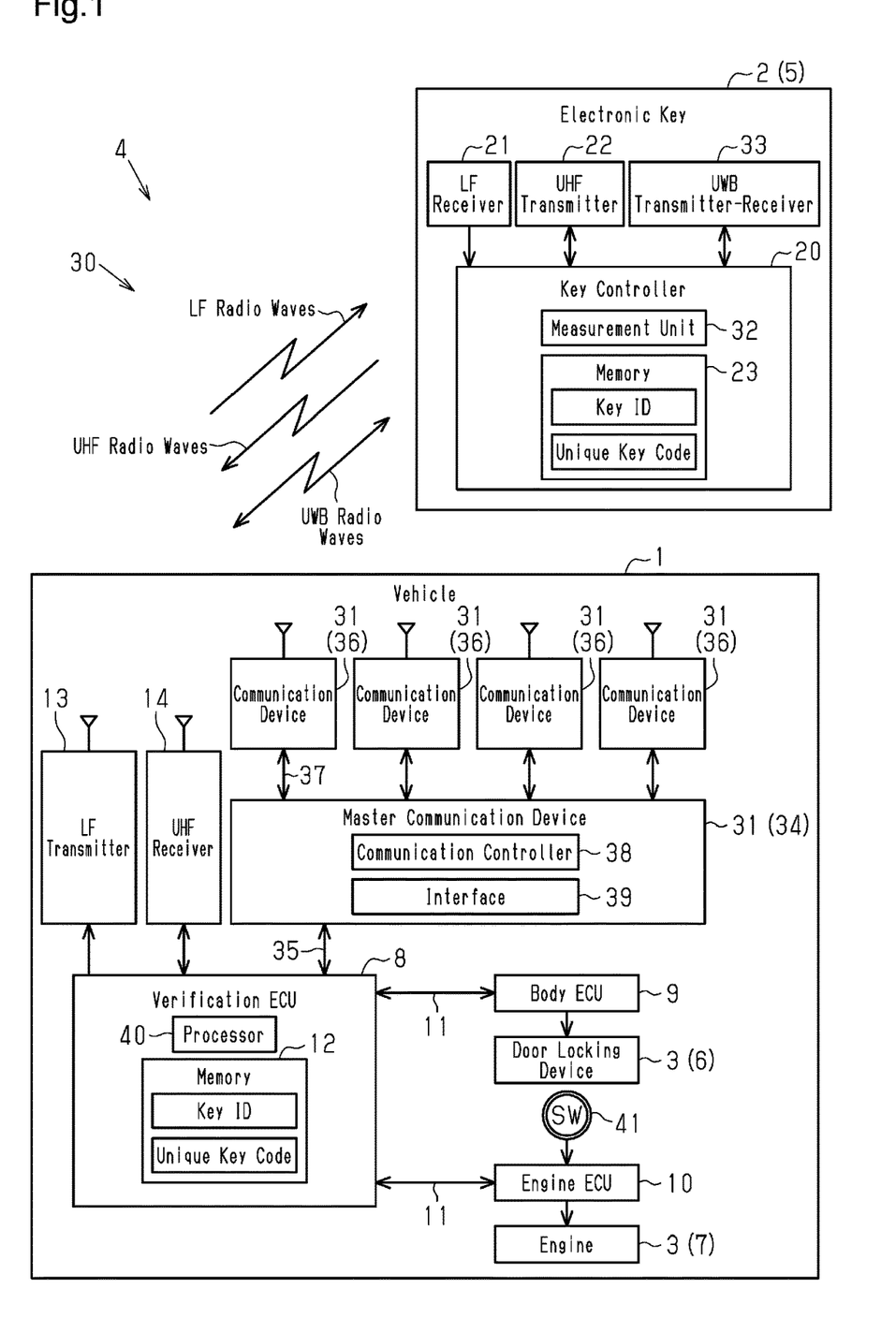
FIG. 1 is a block diagram of the communication system.

As shown in FIG. 1, a vehicle 1 serving as a communication peer includes an electronic key system 4 that determines the authenticity of a terminal 2 through wireless communication to control permission for the actuation of an onboard device 3. The electronic key system 4 of the present example is a smart verification system that performs ID verification (smart verification) through wireless communication when communication is established with the vehicle 1. Communication for ID verification performed by the electronic key system 4 corresponds to first communication. Preferably, the terminal 2 is an electronic key 5 that mainly has, for example, key functionality. Examples of the onboard device 3 include a door locking device 6, which controls the locking and unlocking of vehicle doors, and an engine 7 of the vehicle 1.

The vehicle 1 includes a verification ECU 8 that performs ID verification, a body ECU 9 that manages the power supplied to onboard electric components, and an engine ECU 10 that controls the engine 7. The verification ECU 8 corresponds to a controller that controls communication in the vehicle 1. The ECUs 8 to 10 are connected by interior communication lines 11. Examples of the communication lines 11 include a controller area network (CAN) or a local interconnect network (LIN). The verification ECU 8 includes a memory 12 that stores a key ID of the terminal 2 registered to the vehicle 1 and a unique key code used to authenticate the terminal 2. The body ECU 9 controls a door locking device 6 that locks or unlocks a vehicle door.

The vehicle 1 includes an LF transmitter 13, which transmits radio waves in the low frequency (LF) band, and a UHF receiver 14, which receives radio waves in the ultra-high frequency (UHF) band, to perform communication for ID verification with the terminal 2. Preferably, the LF transmitter 13 performs, for example, exterior transmission for transmitting radio waves to the terminal 2 located outside the passenger compartment of the vehicle 1 and interior transmission for transmitting radio waves to the terminal 2 located inside the passenger compartment of the vehicle 1.

The terminal 2 includes a terminal controller 20 that controls the terminal 2. The terminal 2 also includes an LF receiver 21, which receives LF radio waves, and a UHF transmitter 22, which transmits UHF radio waves, to perform communication for ID verification with the vehicle 1. The terminal controller 20 includes a memory 23 that stores the unique key ID and the unique key code, which are used for ID verification.

The LF transmitter 13 of the vehicle 1 transmits in LF a wake signal at regular or irregular intervals. When the terminal 2 receives the wake signal in a standby state, the terminal 2 is activated to transmit in UHF an acknowledgment signal. When the verification ECU 8 receives the acknowledgment signal from the terminal 2 in response to the wake signal, the verification ECU 8 starts smart verification. When the wake signal received from the LF transmitter 13 by the terminal 2 is for exterior transmission, the verification ECU 8 performs exterior smart verification with the terminal 2, which is located outside the passenger compartment. When the wake signal received from the LF transmitter 13 by the terminal 2 is for interior transmission, the verification ECU 8 performs interior smart verification with the terminal 2, which is located inside the passenger compartment. The smart verification includes, for example, key ID verification that checks the key ID registered to the terminal 2, challenge-response authentication using the unique key code, and the like. In challenge-response authentication, the vehicle 1 and the terminal 2 both calculate a response code in response to a challenge code, which is a random number, and checks whether the response codes are in correspondence. The verification ECU 8 determines that smart verification is accomplished when the key ID verification and the challenge-response authentication are both accomplished.

The vehicle 1 includes a distance measurement system 30 that uses radio waves transmitted and received between the vehicle 1 and the terminal 2 to measure the distance between the vehicle 1 and the terminal 2. Communication for distance measurement performed by the distance measurement system 30 corresponds to second communication. The distance measurement system 30 of the present example includes an unauthorized communication detection functionality that obtains a measurement value Dx, which corresponds to the distance between the vehicle 1 and the terminal 2, and determines whether authentication (smart verification in present example) is accomplished by checking the validity of the measurement value Dx. The distance measurement system 30 is installed in the vehicle 1 to counter fraudulent acts using, for example, a relay or the like to connecting the terminal 2, which is distant from the vehicle 1, to the vehicle 1 in a manner allowing for communication in order to accomplish smart verification in an unauthorized manner.

The distance measurement system 30 includes communication devices 31 arranged in the vehicle 1. The communication devices 31 of the present example transmit and receive radio waves in the ultra-wide (UWB) band. The distance measurement system 30 includes, for example, a measurement unit 32 and a UWB transmitter-receiver 33, which are arranged in the terminal 2 to perform communication for distance measurement. When the measurement unit 32 of the present example receives a UWB radio wave Sa transmitted from the communication devices 31, the measurement unit 32 transmits a UWB radio wave Sa in response from the UWB transmitter-receiver 33.

Each communication devices 31 measures, for example, a propagation time required for the UWB radio wave Sa to be transmitted to the terminal 2 and a response to be received from the terminal 2 to calculate the measurement value Dx, which corresponds to the distance between the vehicle 1 (communication device 31) and the terminal 2, from the propagation time. The measurement value Dx is a distance measurement value that corresponds to the distance between the vehicle 1 and the terminal 2. Further, the communication device 31 determines whether the measurement value Dx is valid. The measurement value Dx is determined as being valid when, for example, the measurement value Dx is less than a preset value Dk.

The communication devices 31 include a master communication device 34, which serves as a first communication device, and slave communication devices 36, which serve as second communication devices. The master communication device 34 is connected to the verification ECU 8. The slave communication devices 36 are connected to the master communication device 34. The present example uses only one master communication device 34. The master communication device 34 is connected to the verification ECU 8 by a communication line 35. The master communication device 34 is connected to the slave communication devices 36 by communication lines 37. The slave communication devices 36 are connected only to the master communication device 34. Examples of the communication line 35 and the communication lines 37 include a controller area network (CAN) or a local interconnect network (LIN). The communication line 35 may have a communication interface such as a universal asynchronous receiver transmitter (UART).

The master communication device 34 includes a communication controller 38 that controls actuation of the slave communication devices 36. The communication controller 38 starts communication for distance measurement when, for example, an instruction for distance measurement is received from the verification ECU 8. When executing control to transmit the UWB radio wave Sa from the communication devices 31, the communication controller 38 sets, for example, the actuation order of the communication devices 31 or selectively actuates one of more of the communication devices 31.

The master communication device 34 includes an interface 39 that is configured to communicate with the verification ECU 8. When, for example, the master communication device 34 receives an instruction to perform distance measurement from the verification ECU 8, the interface 39 sends the instruction to the slave communication devices 36 to perform distance measurement with the slave communication devices 36. The interface 39 receives a determination result of the measurement value Dx from the slave communication devices 36 and sends the result to the verification ECU 8.

The distance measurement system 30 includes a processor 40 that controls authentication communication (smart communication in present example) in accordance with a determination result of whether the measurement value Dx is valid. The processor 40 of the present example is arranged in the verification ECU 8. When the processor 40 determines that communication (measurement value Dx) is valid from the determination result of the communication devices 31, the processor 40 validates the verification result of smart verification. When the processor 40 determines that communication (measurement value Dx) is invalid, the processor 40 invalidates the verification result of smart verification. When smart verification is accomplished and the processor 40 validates the verification result, the verification ECU 8 actuates or allows the onboard device 3 to be actuated.

Figure 2:
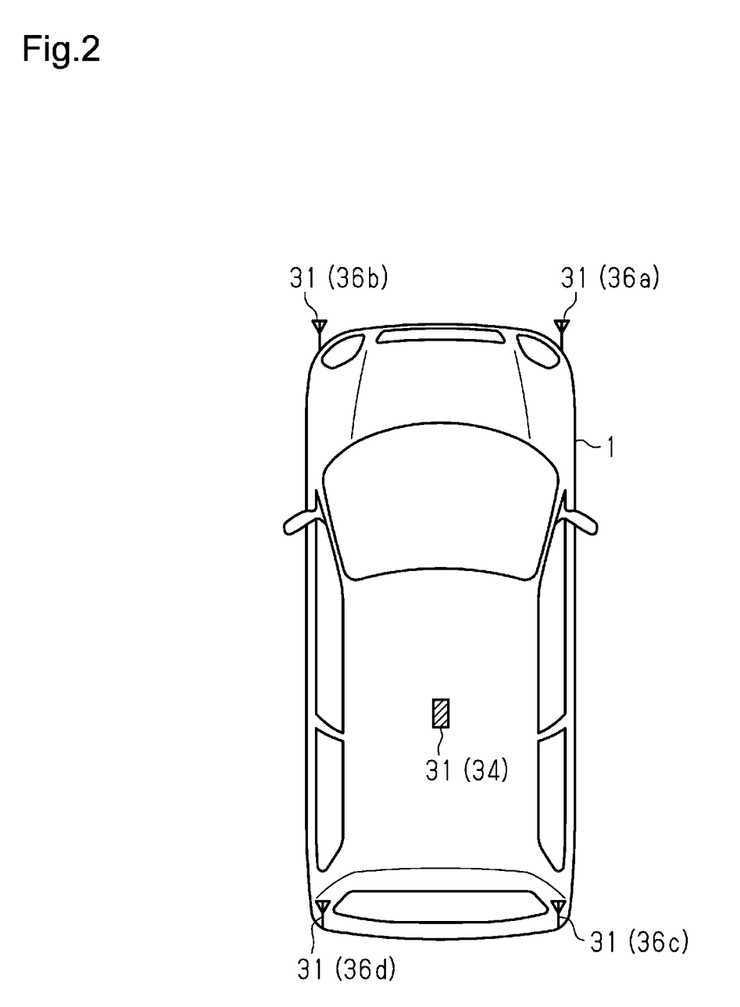
FIG. 2 is a diagram showing the layout of communication devices in a vehicle.

As shown in FIG. 2, in the present example, the communication devices 31 are arranged at five locations in the vehicle 1. Among the communication devices 31, the master communication device 34 is arranged inside the passenger compartment of the vehicle 1 to transmit a UWB radio wave Sa inside the passenger compartment. First to fourth slave communication devices 36a to 36d are examples of the slave communication devices 36 shown in FIG. 1. The first slave communication device 36a is arranged at the corner of the vehicle 1 in front of the driver seat to transmit the UWB radio wave Sa frontward from the vehicle 1 and toward the driver seat. The second slave communication device 36b is arranged at the corner of the vehicle 1 in front of the passenger seat to transmit the UWB radio wave Sa frontward from the vehicle 1 and toward the passenger seat. The third slave communication device 36c is arranged at corner of the vehicle 1 located toward the rear from the driver seat to transmit the UWB radio wave Sa rearward from the vehicle 1 and toward the driver seat. The fourth slave communication device 36d is arranged at the corner of the vehicle 1 located toward the rear from the passenger seat to transmit the UWB radio wave Sa rearward from the vehicle 1 and toward the passenger seat.

The operation and advantages of the communication system in the present embodiment will now be described with reference to FIG. 3.

Figure 3:
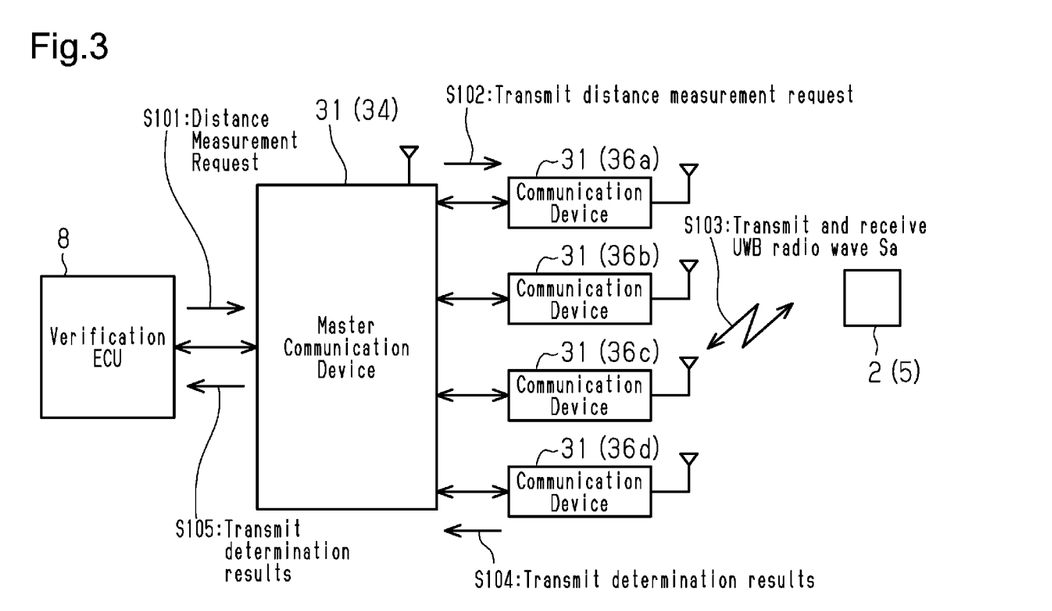
FIG. 3 is a diagram illustrating the procedure for measuring distance.

As shown in FIG. 3, in step S101, the verification ECU 8 transmits a distance measurement request to the master communication device 34. The distance measurement request is transmitted when, for example, exterior smart verification or interior smart verification is accomplished.

In step S102, the interface 39 of the master communication device 34 receives the distance measurement request and notifies the slave communication devices 36a to 36d of the distance measurement request. The notification of the distance measurement request also serves as a command to transmit a UWB radio wave Sa from, for example, the slave communication devices 36a to 36d. For example, the communication controller 38 of the master communication device 34 sets the actuation order of the slave communication devices 36a to 36d so that the slave communication devices 36a to 36d will transmit the UWB radio wave Sa in the actuation order. The communication controller 38 controls when the slave communication devices 36a to 36d are actuated by, for example, notifying the slave communication devices 36a to 36d of the distance measurement request at different times. When the master communication device 34 is actuated, the master communication device 34 transmits the UWB radio wave Sa without issuing the distance measurement request.

In step S103, the communication devices 31 (communication devices 34, 36a to 36d) each transmit the UWB radio wave Sa to the terminal 2 when actuated. The measurement unit 32 of the terminal 2 receives the UWB radio waves Sa from the communication devices 31 and transmits a UWB radio wave Sa in response. The communication devices 31 measure the time from when the UWB radio wave Sa was transmitted to when the UWB radio wave Sa was received in response. Each communication devices 31 calculates the measurement value Dx, which corresponds to the distance between the communication device 31 and the terminal 2, from the measured time.

In step S104, each communication device 31 (communication devices 34, 36a to 36d) determines the validity of the measurement value Dx. When the measurement value Dx is less than a preset value Dk, the communication device 31 determines that the distance between the vehicle 1 and the terminal 2 is valid. When the measurement value Dx is greater than or equal to the preset value Dk, the communication device 31 determines that the distance between the vehicle 1 and the terminal 2 is invalid. The slave communication devices 36a to 36d each output the determination result to the master communication device 34.

In step S105, the interface 39 of the master communication device 34 notifies the verification ECU 8 of the determination results from the slave communication devices 36a to 36d. Further, the master communication device 34 notifies the verification ECU 8 of its determination result. The processor 40 of the verification ECU 8 determines the validity of the smart verification. The processor 40 validates the verification result of smart verification when, for example, any one of the communication devices 31 determines that the measurement value Dx is valid. The processor 40 invalidates the verification result of smart verification when the communication devices 31 all determine that the measurement value Dx is invalid.

When smart verification (exterior smart verification) of the terminal 2 that is located outside the passenger compartment is accomplished and the processor 40 validates the verification result, the verification ECU 8 has the body ECU 9 lock or unlock the door locking device 6 or allows the body ECU 9 to lock or unlock the door locking device 6. Thus, the vehicle door will be unlocked if the door is locked when an exterior door handle is touched, and the vehicle door will be locked if the vehicle door is unlocked when a lock button of the exterior door handle is pushed. When smart verification (interior smart verification) of the terminal 2 that is located inside the passenger compartment is accomplished and the processor 40 validates the verification result, the verification ECU 8 allows for shifting of the state of a vehicle power supply when an engine switch 41 arranged in the passenger compartment is operated. Thus, the engine 7 can be started by, for example, operating the engine switch 41 when the brake pedal is depressed.

When the processor 40 invalidates the verification result of the smart verification, the verification ECU 8 prohibits the actuation of the onboard device 3 regardless of whether smart communication is established. Thus, the onboard device 3 will not be actuated through unauthorized communication that is performed with, for example, a relay or the like.

In the present example, the communication devices 31 include the master communication device 34, which is connected to the verification ECU 8, and the slave communication devices 36, which are connected to the master communication device 34. With this configuration, the verification ECU 8 only needs to be connected to the master communication device 34. Thus, the changes in design are less compared with when the verification ECU 8 is connected to all of the communication devices 31. Consequently, there is no need for major design changes to perform communication for distance measurement. Further, when the specifications of the verification ECU 8 are changed, the master communication device 34 is changed accordingly but the slave communication devices 36 do not have to be changed for connection. This allows for easy connection of the communication devices 31 to the verification ECU 8. Further, when the quantity of the slave communication devices 36 is changed, only the master communication device 34 is changed. Thus, changes to the design of the verification ECU 8 are minimal.

In the present example, the slave communication devices 36 are connected only to the master communication device 34. With this configuration, when the slave communication devices 36 are changed, only the master communication device 34 is changed.

In the present example, the master communication device 34 includes the interface 39 that communicates with the verification ECU 8, and the slave communication devices 36 communicate with the verification ECU 8 through the master communication device 34. With this functionality, the master communication device 34 includes the functionality of an interface connected to the verification ECU 8. This allows the master communication device 34 to manage communication between the slave communication devices 36 and the verification ECU 8.

In the present example, the master communication device 34 includes the communication controller 38 that controls actuation of the communication devices 31 (master communication device 34 and slave communication devices 36). With this structure, the verification ECU 8 does not need to control the communication devices 31. Thus, the verification ECU 8 undergoes less modifications.

In the present example, the communication devices 31 are arranged inside and outside the passenger compartment of the vehicle 1, and the master communication device 34 is arranged inside the passenger compartment of the vehicle 1. With this configuration, the master communication device 34 that is arranged inside the passenger compartment ensures the security of the master communication device 34. When the communication devices 31 provides coverage for the inside and outside of the passenger compartment when performing communication for distance measurement inside and outside the passenger compartment.

In the present example, the electronic key system 4 performs communication for ID verification, and the distance measurement system 30 performs communication for distance measurement. The verification ECU 8 controls the actuation of the vehicle 1 in accordance with a result of the ID verification and a result of the distance measurement. With this configuration, when controlling the actuation of the vehicle 1, the distance measurement is required in addition to the ID verification to authenticate the terminal 2. This improves the security of the communication system.

In the present example, the master communication device 34 that is connected to the verification ECU 8 is also connected to the slave communication devices 36. The verification ECU 8 controls communication in the connection between the master communication device 34 and the verification ECU 8, and the master communication device 34 controls communication in the connection between the master communication device 34 and the slave communication devices 36. Thus, the communication performed between the master communication device 34 and the verification ECU 8 differs from the communication performed between the master communication device 34 and the slave communication devices 36. With this configuration, only the master communication device 34 needs to be changed in accordance with the communication specifications of the verification ECU 8.

The above-described embodiments may be modified as follows. The above-described embodiments and the following modifications can be combined as long as the combined modifications remain technically consistent with each other.

The communication for distance measurement, which serves as the second communication, may be performed before, during, or after smart communication, which serves as the first communication.

The LF transmitter 13 may be arranged to form an LF radio wave (wake signal) area around the vehicle 1. For example, the LF transmitter 13 may form the LF radio wave area around the door next to the driver seat, the door next to the passenger seat, a back door, or inside the passenger compartment.

The communication controller 38 may control the actuation of the communication devices 31 in accordance with the LF radio wave area formed by the LF transmitter 13. For example, when the terminal 2 enters the LF radio wave area formed around the door next to the driver seat and exterior smart verification is accomplished, the communication controller 38 may actuate only the first slave communication devices 36a and the third slave communication device 36c and does not need to actuate the remaining communication devices.

Communication for distance measurement does not need to be performed when exterior smart verification is performed so that communication for distance measurement is performed only when interior smart verification is performed. Specifically, the communication devices 31 do not need to be actuated when the LF radio wave area is formed outside the vehicle 1, and the communication devices 31 may be actuated when the LF radio wave area is formed inside the passenger compartment.

The processor 40 may be arranged in the master communication device 34, the verification ECU 8, the slave communication devices 36, or the terminal 2.

Determination results from communication devices 31 may be collectively transmitted from the master communication device 34 to the verification ECU 8.

The master communication device 34 may notify the verification ECU 8 of whether smart verification is accomplished, the determination results from the communication devices 31, the measurement values Dx of the communication devices 31, and whether a UWB radio wave Sa is transmitted or received. For example, when the processor 40 is arranged in the master communication device 34, the master communication device 34 may notify the verification ECU 8 of whether smart verification is accomplished.

When communication for distance measurement is performed before or during smart verification and the smart verification is not permitted, smart communication may be forcibly terminated. In other words, when smart verification is not permitted, the processor 40 may perform a process that does not allow smart verification (smart communication) to be accomplished.

The slave communication devices 36 do not need to perform all communication with the verification ECU 8 through the master communication device 34. Instead, the slave communication devices 36 may perform part of the communication directly with the verification ECU 8.

The measurement value Dx may be calculated by the communication devices 31, the terminal 2, the master communication device 34, the verification ECU 8, or a combination thereof.

The validity of the measurement value Dx may be determined by the communication devices 31, the terminal 2, the master communication device 34, the verification ECU 8, or a combination thereof.

Communication for distance measurement does not need obtain the distance from the propagation time. For example, a received signal strength indicator (RSSI) of radio waves, and the RSSI value may be used to obtain a measurement value that corresponds to the distance.

During communication for distance measurement, the terminal 2 may transmit a UWB radio wave Sa in a configuration in which the terminal 2 calculates the measurement value Dx.

The communication devices 31 of the vehicle 1 may be configured to only receive signals, and the terminal 2 may be configured to only receive a UWB radio wave Sa in a configuration in which distance measurement is performed with RSSI.

The terminal 2 does not need to include the measurement unit 32 or the UWB transmitter-receiver 33 in a configuration in which the terminal 2 includes an antenna and obtains a measurement value Dx from radio waves reflected by the antenna.

Distance measurement (to obtain measurement value Dx) may be performed by, for example, transmitting radio waves in multiple channels and calculating measurement values Dx from the radio waves of each channel.

Distance measurement does not have to use UWB radio waves Sa. Instead, radio waves in other frequencies may be used.

Any of various types of frequencies of radio waves and communication protocols may be used for the communication performed between the vehicle 1 and the terminal 2.

In the smart verification system, the terminal 2 may transmit a wake signal.

The authenticity of the terminal 2 does not need to be verified through key ID verification or challenge-response authentication as long as the pairing of the terminal 2 and the vehicle 1 can be checked through communication.

The electronic key system 4 is not limited to the smart verification system. The electronic key system 4 only needs to verify the authenticity of the terminal 2.

The distance measurement system 30 does not need to include the unauthorized communication detection functionality that determines whether authentication is accomplished. Instead, the distance measurement system 30 only needs to measure the distance between the vehicle 1 and the terminal 2.

The first communication is not limited to communication for verifying the authenticity of the terminal 2.

The second communication is not limited to communication for distance measurement between the vehicle 1 and the terminal 2.

Communication between the controller and the first communication device and communication between the first communication device and the second communication devices may be performed in a wired or wireless manner.

The communication peer does not need to be the vehicle 1 and may be a house or a building.

Any one or more of the devices included in the communication system (such as verification ECU 8 and/or communication devices 34, 36) can be configured to be a computer system including one or more processors and a non-transitory memory that stores instructions executable by the processor to implement a communication process in accordance with the above embodiment or the above modification. Alternatively, any one or more of the devices included in the communication system may be configured with dedicated hardware such as an application-specific integrated circuit (ASIC).

The present disclosure includes the following embodiments.

Embodiment 1

A communication system including:
a controller arranged in a communication peer that communicates with a terminal through wireless connection, where the controller controls first communication performed between the communication peer and the terminal,
a first communication device connected to the controller, and
a second communication device connected to the first communication device, where
the controller controls second communication performed between the terminal and at least one of the first communication device and the second communication device.

Embodiment 2

The communication system according to embodiment 1, where
the controller performs, as the first communication, smart communication that obtains identification information (ID) and a unique key code of the terminal to perform ID verification and authentication of the terminal, and
the controller determines whether the smart communication is valid through the second communication performed between the terminal and at least one of the first communication device and the second communication device.

Embodiment 3

The communication system according to embodiment 1 or 2, where
the first communication device is directly connected to the controller,
the second communication device is connected to the controller by the first communication device, and
at least one of the first communication device and the second communication device starts the second communication with the terminal when the first communication device receives a request from the controller to start the second communication.

Embodiment 4

The communication system according to embodiment 3, where the first communication device and the second communication device start the second communication with the terminal in order when the first communication device receives the request from the controller to start the second communication.

Embodiment 5

The communication system according to any one of embodiments 1 to 4, where the second communication is distance measurement communication for obtaining a measurement value that corresponds to a distance between the terminal and the communication peer.

Embodiment 6

A communication device arranged in the communication system according to any one of embodiments 1 to 5.

The invention claimed is:

1. A communication system that performs a first communication and a second communication, which differs from the first communication, through wireless connection between a terminal and a communication peer, the communication system comprising:
communication devices arranged in the communication peer,
wherein the communication devices include a first communication device and a second communication device, which differs from the first communication device,
the first communication device is connected to a controller that controls the communication devices,
the second communication device is connected to the first communication device and communicably connected to the controller through the first communication device,
the first communication device is configured to control actuation of the second communication device,
the first communication is performed to verify authenticity of the terminal through communication between the terminal and the communication peer,
the second communication is performed to measure a distance between the terminal and the communication peer by using radio waves transmitted and received between the terminal and each of the first communication device and the second communication device, the first communication device is configured to notify the controller of a first result of the second communication performed by the second communication device and to notify the controller of a second result of the second communication performed by the first communication device, and the controller is configured to control actuation of the communication peer in response to any one of the first result or the second result indicating that the distance is valid.

2. The communication system according to claim 1, wherein the second communication device is connected only to the first communication device.

3. The communication system according to claim 1, wherein the first communication device includes an interface configured to communicate with the controller, and the second communication device that does not include the interface communicates with the controller through the first communication device.

4. The communication system according to claim 1, wherein the first communication device includes a communication controller that controls the actuation of the second communication device.

5. The communication system according to claim 1, wherein the communication devices are arranged inside and outside a compartment of the communication peer, and the first communication device is arranged inside the compartment of the communication peer.

6. A communication device, the communication device configured to be connected to a controller that controls the communication device, wherein the communication device is a first communication device, the first communication device is configured to be further connected between a second communication device and the controller to allow for the second communication device to communicate with the controller through the first communication device, communication performed between the first communication device and the controller differs from communication performed between the first communication device and the second communication device, the first communication device is configured to control actuation of the second communication device, the first communication device, the second communication device, and the controller are installed in a communication peer that communicates with a terminal, the controller performs a first communication for verifying authenticity of the terminal through communication with the terminal, each of the first communication device and the second communication device performs a second communication for measuring a distance to the terminal by using radio waves transmitted and received through communication with the terminal, the first communication device is configured to notify the controller of a first result of the second communication performed by the second communication device and to notify the controller of a second result of the second communication performed by the first communication device, and the controller is configured to control actuation of the communication peer in response to any one of the first result or the second result indicating that the distance is valid.

7. The communication system according to claim 1, wherein first communication device is configured to control the actuation of the second communication device by notifying the second communication device of a measurement request, after receipt of the measurement request by the first communication device.

8. The communication system according to claim 7, wherein the measurement request is a distance measurement request.

\* \* \* \* \*